(12) United States Patent
Chiang et al.

(10) Patent No.: US 10,755,066 B2
(45) Date of Patent: Aug. 25, 2020

(54) METHOD AND ELECTRONIC DEVICE FOR DETECTING FINGER-ON OR FINGER-OFF

(71) Applicant: Egis Technology Inc., Taipei (TW)

(72) Inventors: Yuan-Lin Chiang, Taipei (TW);
Chun-Ching Tseng, Taipei (TW);
Jun-Chao Lu, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 329 days.

(21) Appl. No.: 15/847,775

(22) Filed: Dec. 19, 2017

(65) Prior Publication Data
US 2018/0196983 A1 Jul. 12, 2018

Related U.S. Application Data

(60) Provisional application No. 62/444,967, filed on Jan. 11, 2017.

(30) Foreign Application Priority Data

Sep. 21, 2017 (CN) .......................... 2017 1 0859123

(51) Int. Cl.
*G06K 9/00* (2006.01)
(52) U.S. Cl.
CPC .................... *G06K 9/0002* (2013.01)

(58) Field of Classification Search
None
See application file for complete search history.

(56) References Cited

U.S. PATENT DOCUMENTS

| | | | |
|---|---|---|---|
| 8,766,931 B2 | 7/2014 | Westhues et al. | |
| 2009/0073140 A1 | 3/2009 | Fujita et al. | |
| 2011/0037720 A1* | 2/2011 | Hirukawa | G06F 3/0488 345/173 |
| 2011/0073384 A1* | 3/2011 | Osoinach | G06F 3/0416 178/18.06 |
| 2012/0303316 A1 | 11/2012 | Juang et al. | |

FOREIGN PATENT DOCUMENTS

| | | |
|---|---|---|
| TW | 201015412 A | 4/2010 |
| TW | 201504904 A | 2/2015 |

* cited by examiner

*Primary Examiner* — David Perlman

(57) ABSTRACT

A method for detecting finger-on or finger-off, including: detecting whether a sensing capacitance value of a sensing signal is higher than a high threshold or lower than a low threshold; and when the sensing capacitance value of the sensing signal is higher than the high threshold, determining that a finger is placed on the fingerprint sensing device and adjusting the high threshold and the low threshold according to the sensing capacitance value and a compensation value, and when the sensing capacitance value of the sensing signal is lower than the low threshold, determining that a finger is removed from the fingerprint sensing device and adjusting the high threshold and the low threshold according to the sensing capacitance value and the compensation value.

14 Claims, 7 Drawing Sheets

METHOD AND ELECTRONIC DEVICE FOR DETECTING FINGER-ON OR FINGER-OFF

CROSS REFERENCE TO RELATED APPLICATIONS

This application claims priority of Provisional Patent Application No. 62/444,967 filed on Jan. 11, 2017 and CN Patent Application No. 201710859123.4 filed on Sep. 21, 2017, the entirety of which is incorporated by reference herein.

BACKGROUND OF THE INVENTION

Field of the Invention

The invention generally relates to technology for detecting finger-on or finger-off, and more particularly, to technology for dynamically adjusting a high threshold and low threshold which are applied to detect finger-on and finger-off.

Description of the Related Art

Electronic devices that have function of fingerprint recognition are becoming a trend on the market. Before such an electronic device is shipped out or when an electronic device is initialized or enabled for the first time, the electronic device is calibrated to obtain a high threshold and a low threshold. The high threshold and the low threshold are used to detect finger-on (i.e. a finger is detected to be placed on the fingerprint sensing device) or finger off (i.e. a finger is detected to be removed from the fingerprint sensing device). However, when an error occurs in the initial calibration, e.g. during the initial calibration, a finger or a non-finger object is placed on the fingerprint sensing device, it may lead to the high threshold too high and/or the low threshold too low. As a result, when detection for finger-on or finger-off is performed, a misjudgment may occur.

BRIEF SUMMARY OF THE INVENTION

A method and electronic device for dynamically adjusting a high threshold and low threshold which are applied to detect finger-on or finger-off are provided.

An embodiment of the invention provides a method for detecting finger-on or finger off. The method for detecting finger-on or finger off is applied to an electronic device which comprises a fingerprint sensing device. The method for detecting finger-on or finger off includes: detecting whether the sensing capacitance value of a sensing signal is higher than a high threshold or lower than a low threshold. When the sensing capacitance value of the sensing signal is higher than the high threshold, the method comprises: determining that a finger is placed on the fingerprint sensing device; and adjusting the high threshold and the low threshold according to the sensing capacitance value and a compensation value. When the sensing capacitance value of the sensing signal is lower than the low threshold, the method comprises: determining that the finger is removed from the fingerprint sensing device; and adjusting the high threshold and the low threshold according to the sensing capacitance value and the compensation value.

An embodiment of the invention provides an electronic device. The electronic device comprises a fingerprint sensing device and a processor. The processor is coupled to the fingerprint sensing device. The processor detects whether a sensing capacitance value of a sensing signal is higher than a high threshold or lower than a low threshold. When the sensing capacitance value of the sensing signal is higher than the high threshold, the processor determines that a finger is placed on the fingerprint sensing device and adjusts the high threshold and the low threshold according to the sensing capacitance value and a compensation value. When the sensing capacitance value of the sensing signal is lower than the low threshold, the processor determines that the finger is removed from the fingerprint sensing device and adjusts the high threshold and the low threshold according to the sensing capacitance value and the compensation value.

Other aspects and features of the invention will become apparent to those with ordinary skill in the art upon review of the following descriptions of specific embodiments of methods and devices.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
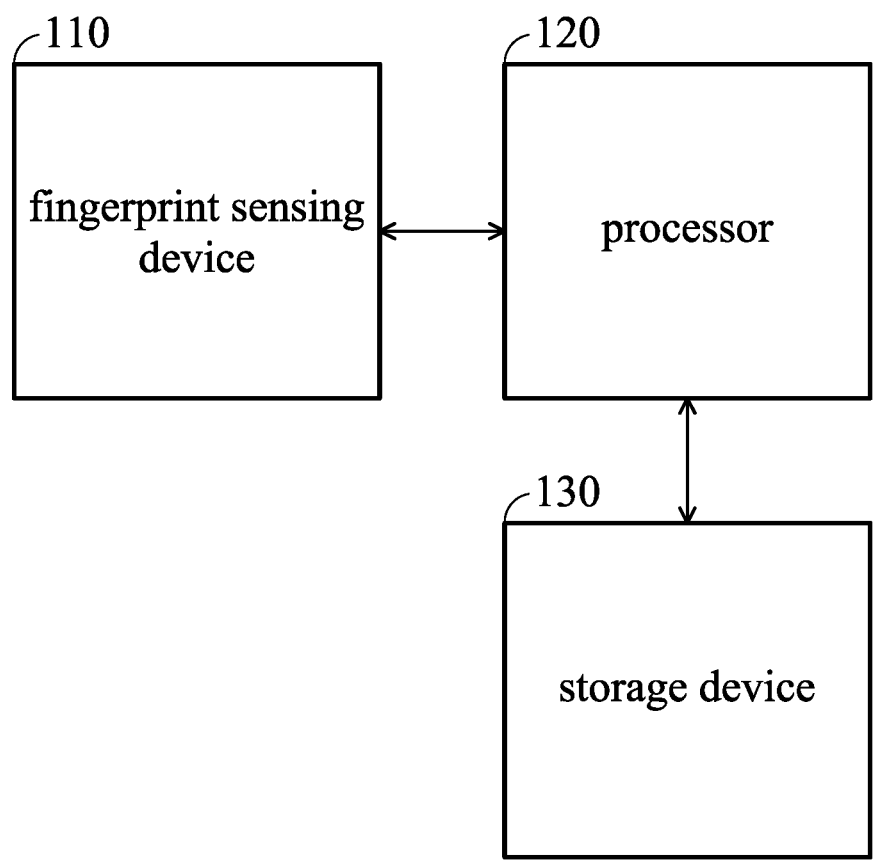
FIG. 1 is a block diagram of an electronic device 100 according to an embodiment of the invention.

FIG. 1 is a block diagram of an electronic device 100 according to an embodiment of the invention. In an embodiment of the invention, the electronic device 100 is an electronic device with a fingerprint recognition function, e.g. a mobile phone, a smartphone, a tablet computer, a notebook computer, and so on. As shown in FIG. 1, the electronic device 100 comprises a fingerprint sensing device 110, a processor 120 and a storage device 130. FIG. 1 presents a simplified block diagram in which only the elements relevant to the invention are shown. However, the invention should not be limited to what is shown in FIG. 1.

In the embodiments of the invention, the fingerprint sensing device 110 may comprise a sensing chip, but the invention should not be limited thereto. The fingerprint sensing device 110 may comprise a sensing array, and the sensing array comprises a plurality of sensing units arranged in two dimensions and each of the sensing units corresponds to a pixel. The storage device 130 may store a high threshold and a low threshold.

Figure 2A:
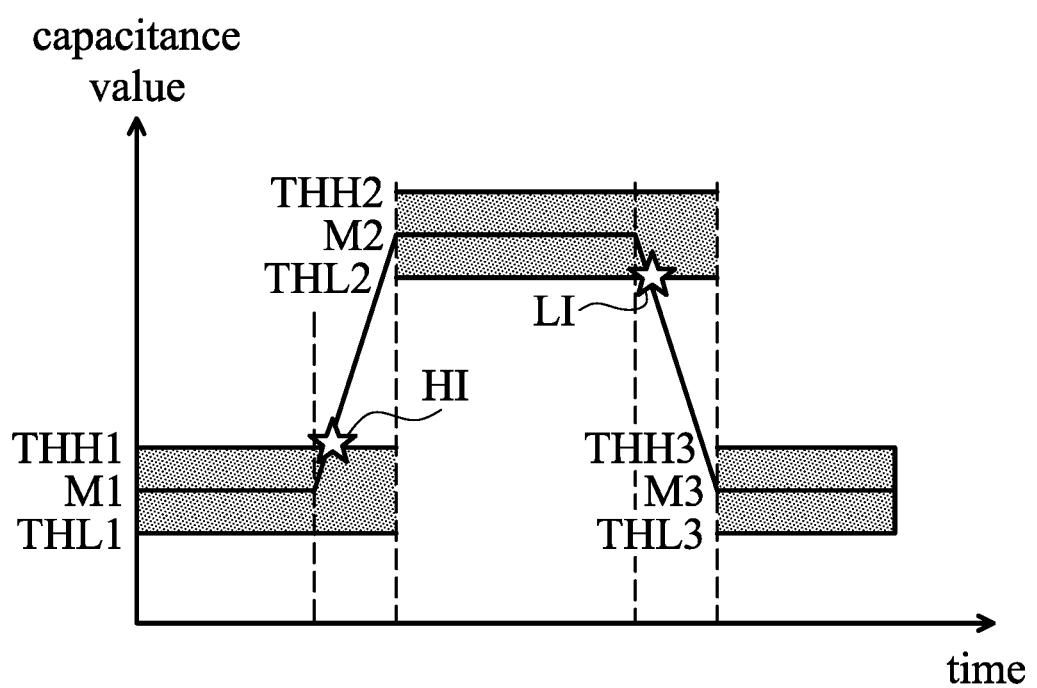
FIGS. 2A-2C are schematic diagrams illustrating adjustment of a high threshold and a low threshold according to an embodiment of the invention.
Figure 2B:
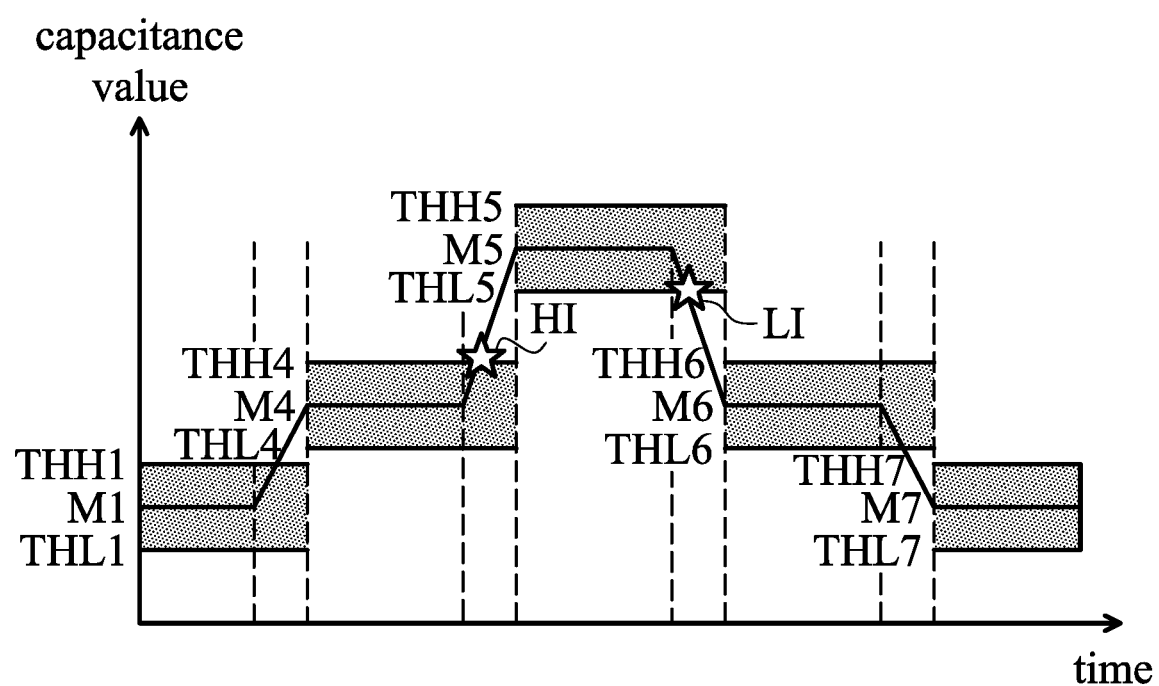
Figure 2C:
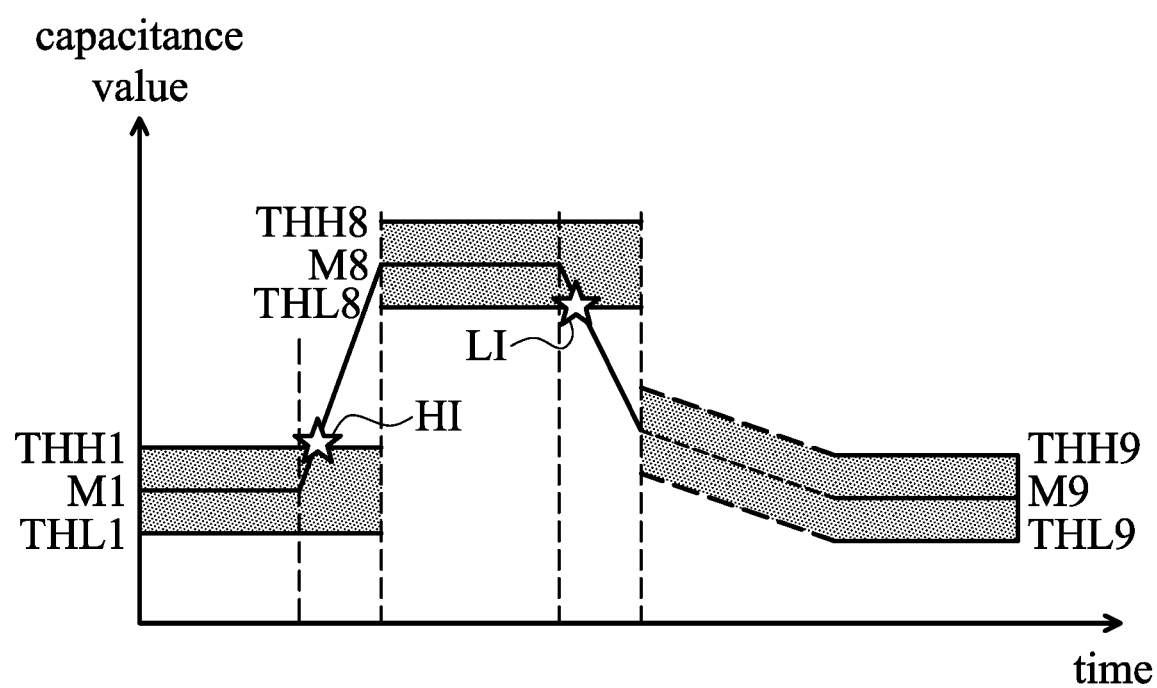

FIGS. 2A-2C are schematic diagrams illustrating adjustment of a high threshold and a low threshold according to an embodiment of the invention. As shown in FIGS. 2A-2C, according to the embodiments of the invention, when the electronic device 100 is shipped out or when the electronic device 100 is initialized or enabled for the first time, the processor 120 may perform an initial calibration for the fingerprint sensing device 110 to obtain a sensing capacitance value M1. Then, the processor 120 may generate a high threshold THH1 and a low threshold THL1 according to the sensing capacitance value M1, wherein the high threshold THH1 is higher than the low threshold THL1. Furthermore, when the electronic device 100 is shipped out or when the electronic device 100 is initialized or enabled for the first time, a high flag value H and a low flag value L are set to be a first bit value (e.g. 0 or OFF). According to the embodiments of the invention, when the high flag value H is the first bit value OFF, it means it is detected that no finger is placed on the fingerprint sensing device 110. When the high flag value H is a second bit value (e.g. 1 or ON), it means that finger-on is detected, i.e. it is detected that a finger is placed on the fingerprint sensing device 110. When the low flag value L is the first bit value OFF, it means that it is not detected that a finger is removed from the fingerprint sensing device 110. When the low flag value L is the second bit value ON, it means that finger-off is detected, i.e. a finger is detected to be removed from the fingerprint sensing device 110.

According to the embodiments of the invention, the high threshold THH1 is one high threshold used to detect finger-on, and the low threshold THL1 is one low threshold used to detect finger-off. The high threshold is used to determine whether a finger is placed on the fingerprint sensing device 110 (i.e. finger-on), and the low threshold is used to determine whether a finger is removed from the fingerprint sensing device 110 (i.e. finger-off).

According to an embodiment of the invention, the high threshold THH1 is generated by adding a compensation value $\Delta$ to the sensing capacitance value M1, and the low threshold THL1 is generated by subtracting the compensation value $\Delta$ from the sensing capacitance value M1. According to the embodiments of the invention, the compensation value $\Delta$ is a constant. The compensation value $\Delta$ is a fixed value which is predetermined and pre-stored when the electronic device 100 is shipped out, and its value is higher than a noise value. For example, the noise value may be the variation of the capacitance value generated by the fingerprint sensing device 110 when the electronic device 100 is being charged or a radio frequency signal is inputted to the electronic device 100. Therefore, the compensation value $\Delta$ may be the amplitude of the variation of the capacitance value.

According to the embodiments of the invention, after initial calibration, when the fingerprint sensing device 110 generates a sensing signal (not shown in figures), the processor 120 may detect whether the sensing capacitance value of the sensing signal is higher than the high threshold THH1 or lower than the low threshold THL1 to determine finger-on or finger off.

According to the embodiments of the invention, when the sensing capacitance value of the sensing signal is higher than the high threshold THH1, the processor 120 may further determine whether the high flag value H is the second bit value (e.g. 1 or ON). When the high flag value H is the second bit value ON, it means that a finger was detected to be placed on the fingerprint sensing device 110 previously (i.e. it was detected that a finger was placed on the fingerprint sensing device 110, that is, finger-on was detected previously). Therefore, the processor 120 may adjust the high threshold THH1 and the low threshold THL1 according to the sensing capacitance value of the sensing signal.

When the high flag value H is the first bit value (e.g. 0 or OFF), it means that no finger was detected to be placed on the fingerprint sensing device 110 previously. Then, the processor 120 may determine whether the object currently placed on the fingerprint sensing device 110 is a real finger. Taking FIG. 2A for example, if the object is a real finger, the processor 120 may generate a high threshold interrupt signal HI to indicate that finger-on is detected, i.e. it is detected that a finger is placed on the fingerprint sensing device 110. Then, the processor 120 may set the high flag value H to be the second bit value ON (i.e. finger-on is detected) and maintain the low flag value L to be the first bit value OFF. Then, the processor 120 may adjust the high threshold THH1 and the low threshold THL1 according to the sensing capacitance value of the sensing signal. As shown in FIG. 2A, the processor 120 may adjust the high threshold THH1 and the low threshold THL1 according to the sensing capacitance value M2 to generate the adjusted (new) high threshold THH2 and the adjusted (new) low threshold THL2.

In the above embodiment of the invention, if the object is a non-finger object, taking FIG. 2B for example, the processor 120 will not generate a high threshold interrupt signal HI and will directly adjust the high threshold THH1 and the low threshold THL1 according to the sensing capacitance value M4 to generate the adjusted (new) high threshold THH4 and the adjusted (new) low threshold THL4.

According to another embodiment of the invention, when the sensing capacitance value of the sensing signal is lower than the low threshold THL1, the processor 120 may determine whether the high flag value H is the second bit value (e.g. 1 or ON). When the high flag value H is the second bit value ON (i.e. finger-on was detected previously), the processor 120 may generate a low threshold interrupt signal LI to indicate that the finger that was previously detected to be placed on the fingerprint sensing device 110 is removed from the fingerprint sensing device 110, and the processor 120 may set the high flag value H to be the first bit value (e.g. 0 or OFF) and set the low flag value L to be the second bit value ON to indicate that finger-off is detected. Then, the processor 120 may adjust the high threshold THH1 and the low threshold THL1 according to the sensing capacitance value. Taking FIG. 2A for example, before the sensing capacitance value M2 is detected, it was detected previously that a finger was placed on the fingerprint sensing device 110 (i.e. finger-on was detected previously, and the high flag value H was set to be the second bit value ON). Therefore, when the sensing capacitance value M3 is lower than the low threshold THL2, the processor 120 may generate a low threshold interrupt signal LI to indicate that the finger that was previously detected to be placed on the fingerprint sensing device 110 is removed from the fingerprint sensing device 110 (e.g. finger-off is detected), and the processor 120 may set the high flag value H to be the first bit value OFF and set the low flag value L to be the second bit value ON to indicate that finger-off is detected. Then, the processor 120 may adjust the high threshold THH2 and the low threshold THL2 according to the sensing capacitance value M3 to generate the high threshold THH3 and the low threshold THL3.

In the above embodiment, when the high flag value H is the first bit value OFF, the processor 120 may directly adjust the high threshold THE and the low threshold THL according to the sensing capacitance value. Taking FIG. 2B for example, before the sensing capacitance value M6 is detected, it was detected previously that a finger was removed from the fingerprint sensing device 110. Therefore, when the sensing capacitance value M7 is lower than the low threshold THL6, the processor 120 may directly adjust the high threshold THH6 and the low threshold THL6 according to the sensing capacitance value M7 to generate the high threshold THH7 and the low threshold THL7.

According to another embodiment of the invention, when the high threshold and the low threshold need to be adjusted because finger-off is detected, the processor 120 may gradually reduce the high threshold and the low threshold to avoid auto-unlocking. As shown in FIG. 2C, when the high threshold THH8 and the low threshold THL8 need to be adjusted to be the high threshold THH9 and the low threshold THL9, the processor 120 may gradually reduce the high threshold THH8 and the low threshold THL8 to be the high threshold THH9 and the low threshold THL9 rather than without directly changing the high threshold THH8 and the low threshold THL8 to be the high threshold THH9 and the low threshold THL9.

According to the embodiments of the invention, the high threshold THH2 is generated by adding a compensation value $\Delta$ to the sensing capacitance value M2, and the low threshold THL2 is generated by subtracting the compensation value $\Delta$ from the sensing capacitance value M2. Accordingly, the high threshold THH3 is generated by adding a compensation value $\Delta$ to the sensing capacitance value M3, and the low threshold THL3 is generated by subtracting the compensation value $\Delta$ from the sensing capacitance value M3. The high threshold THH4 is generated by adding a compensation value $\Delta$ to the sensing capacitance value M4, and the low threshold THL4 is generated by subtracting the compensation value $\Delta$ from the sensing capacitance value M4. The high threshold THH5 is generated by adding a compensation value $\Delta$ to the sensing capacitance value M5, and the low threshold THL5 is generated by subtracting the compensation value $\Delta$ from the sensing capacitance value M5. The high threshold THH6 is generated by adding a compensation value $\Delta$ to the sensing capacitance value M6, and the low threshold THL6 is generated by subtracting the compensation value $\Delta$ from the sensing capacitance value M6. The high threshold THH7 is generated by adding a compensation value $\Delta$ to the sensing capacitance value M7, and the low threshold THL7 is generated by subtracting the compensation value $\Delta$ from the sensing capacitance value M7. The high threshold THH8 is generated by adding a compensation value $\Delta$ to the sensing capacitance value M8, and the low threshold THL8 is generated by subtracting the compensation value $\Delta$ from the sensing capacitance value M8. The high threshold THH9 is generated by adding a compensation value $\Delta$ to the sensing capacitance value M9, and the low threshold THL9 is generated by subtracting the compensation value $\Delta$ from the sensing capacitance value M9.

Figure 3A:
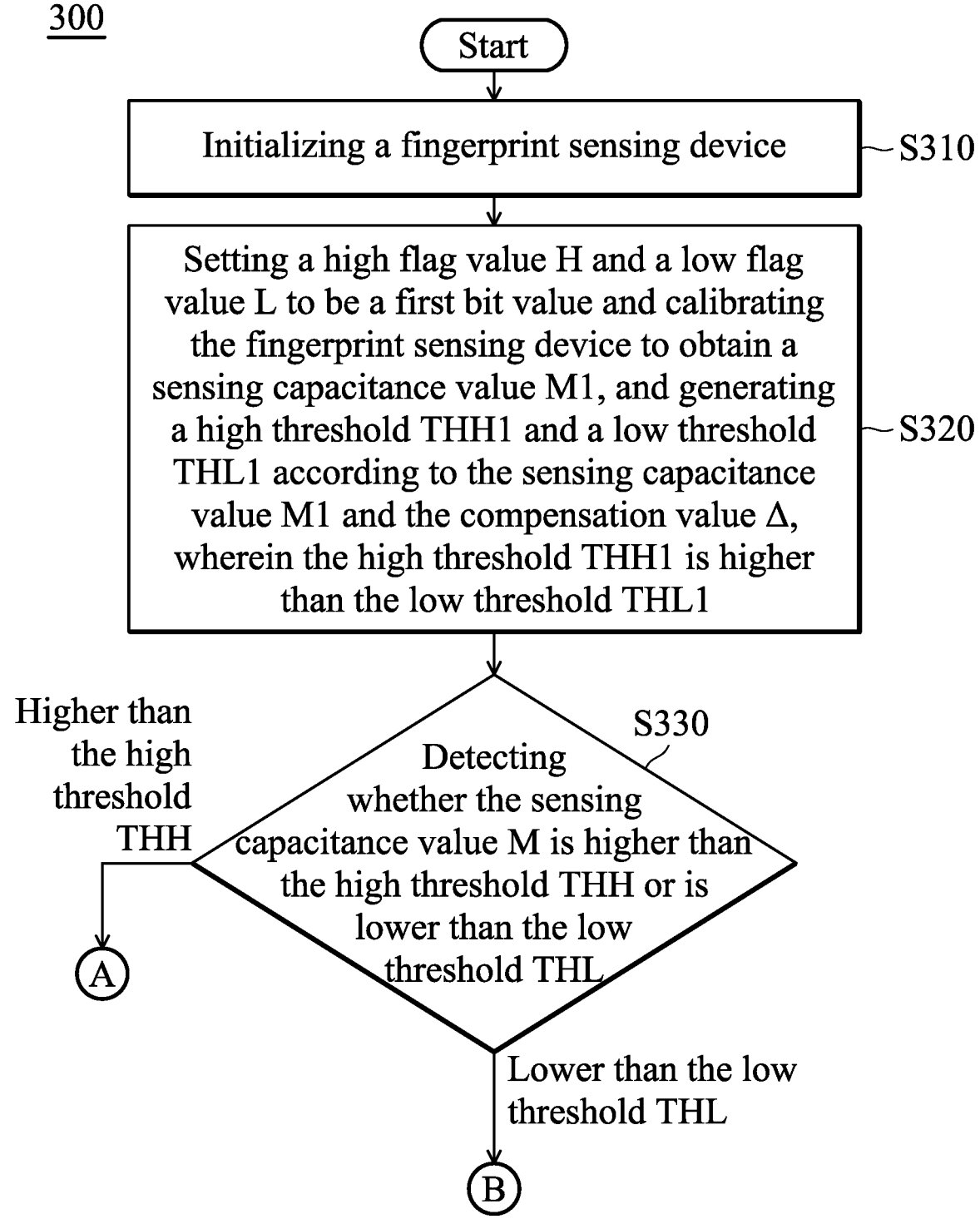
FIGS. 3A-3C is a flow chart 300 illustrating a method for detecting finger-on and finger-off according to an embodiment of the invention.
Figure 3B:
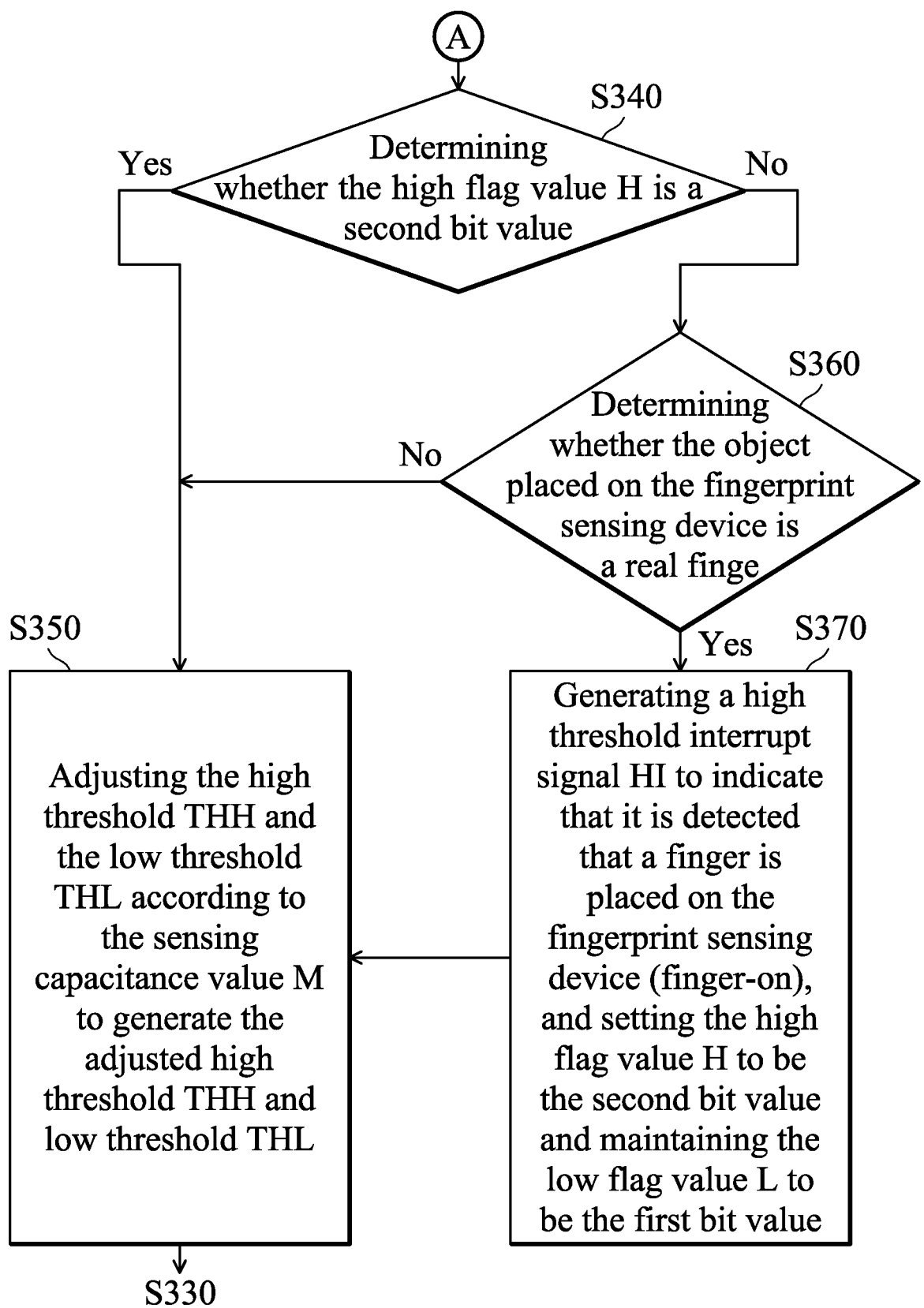
Figure 3C:
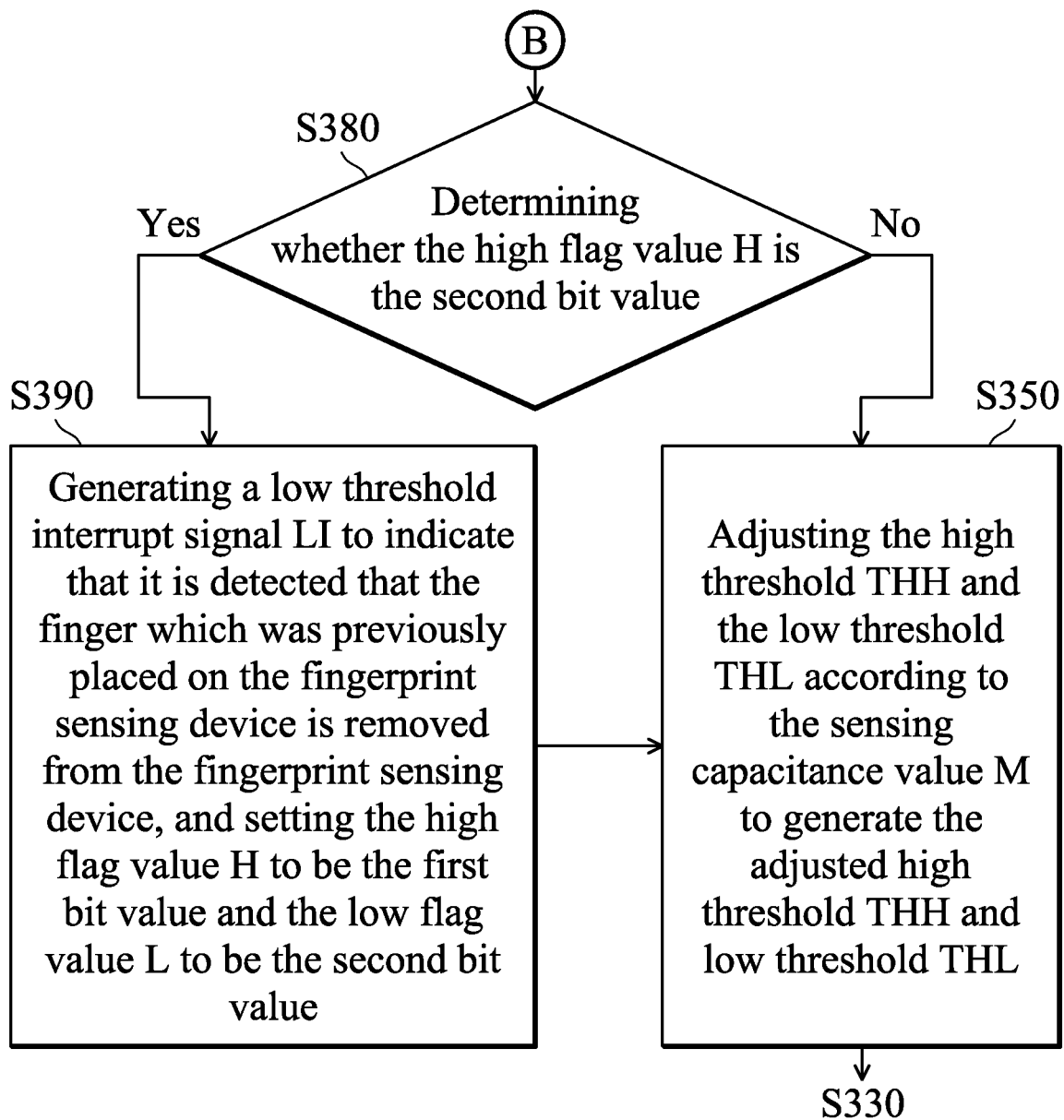

FIGS. 3A-3C is a flow chart 300 illustrating a method for detecting finger-on and finger-off according to an embodiment of the invention. The method for detecting finger-on and finger-off is applied to the electronic device 100. As shown in FIGS. 3A-3C, first, in step S310, the fingerprint sensing device 110 of the electronic device 100 is initialized. In step S320, a high flag value H and a low flag value L are set to be a first bit value (e.g. 0 or OFF) and the fingerprint sensing device 110 is calibrated to obtain a sensing capacitance value M1. A high threshold THH1 is generated by adding a compensation value $\Delta$ to the sensing capacitance value M1, and a low threshold THL1 is generated by subtracting the compensation value $\Delta$ from the sensing capacitance value M1. The high threshold THH1 is higher than the low threshold THL1. The compensation value $\Delta$ is predetermined and pre-stored in the storage device 130 of the electronic device 100, before the electronic device 100 is shipped out.

When the high flag value H is the first bit value OFF, it means that it is not detected that a finger is placed on the fingerprint sensing device 110. When the high flag value H is the second bit value ON, it means that finger-on is detected, i.e. it is detected that a finger is placed on the fingerprint sensing device 110. When the low flag value L is the first bit value OFF, it means that it is not detected that a finger is removed from the fingerprint sensing device 110. When the low flag value L is the second bit value ON, it means that finger-off is detected, i.e. it is detected that a finger is removed from the fingerprint sensing device 110.

In step S330, the electronic device 100 detects whether the sensing capacitance value M is higher than the high threshold THH or is lower than the low threshold THL. When the sensing capacitance value M is higher than the high threshold THH, step S340 is performed. In step S340, the electronic device 100 determines whether the high flag value H is the second bit value (e.g. 1 or ON). When the high flag value H is ON (i.e. finger-on was detected previously), step S350 is performed. In step S350, the electronic device 100 adjusts the high threshold THH and the low threshold THL according to the sensing capacitance value M to generate the adjusted high threshold THH and low threshold THL. The adjusted high threshold THH is generated by adding a compensation value to the sensing capacitance value M, and the adjusted low threshold THL is generated by subtracting the compensation value from the sensing capacitance value M.

When the high flag value H is OFF (i.e. finger-on was not detected previously), step S360 is performed. In step S360, the electronic device 100 determines whether the object placed on the fingerprint sensing device 110 is a real finger.

If the object is a real finger, step S370 is performed. In step S370, a high threshold interrupt signal HI is generated to indicate that it is detected that a finger is placed on the fingerprint sensing device 110 (i.e. finger-on), and the electronic device 100 sets the high flag value H to be the second bit value ON and maintains the low flag value L to be the first bit value OFF. Then, step S350 is performed where the electronic device 100 adjusts the high threshold THH and the low threshold THL according to the sensing capacitance value M. If the object is a non-finger object, step S350 is performed where the electronic device 100 may adjust the high threshold THH and the low threshold THL according to the sensing capacitance value M.

When the sensing capacitance value M is lower than the low threshold THL, step S380 is performed. In step S380, the electronic device 100 determines whether the high flag value H is the second bit value ON. When the high flag value H is ON (i.e. finger-on was detected previously), step S390 is performed. In step S390, a low threshold interrupt signal LI is generated to indicate that it is detected that the finger which was previously placed on the fingerprint sensing device 110 is removed from the fingerprint sensing device 110 (i.e. finger-off is detected currently), and the electronic device 100 sets the high flag value H to be first bit value OFF (i.e. finger-on is not detected) and sets the low flag value L to be the second bit value ON (i.e. finger-off is detected). Then, step S350 is performed where the electronic device 100 adjusts the high threshold THH and the low threshold THL according to the sensing capacitance value M. When the high flag value H is OFF (i.e. finger-on was not detected previously, therefore, no finger-off will then be detected), step S350 is performed directly.

In the method and electronic device for detecting finger-on and finger-off according to the embodiments of the invention, the high threshold THH and the low threshold THL which are used to determine finger-on and finger-off can be adjusted dynamically. Therefore, when the high threshold THH and the low threshold THL generated in the initial calibration of the fingerprint sensing device 110 are inappropriate (e.g. during the initial calibration, a finger or other object is falsely placed on the fingerprint sensing device 110 by accident, as a result, the initial high threshold THE and low threshold THL may be too high or too low), the electronic device 100 may dynamically adjust the high threshold THH and low threshold THL used to determine finger-on and finger-off so as to increase the accuracy for determining finger-on and finger-off.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for detecting finger-on or finger off, applied to an electronic device which comprises a fingerprint sensing device, the method comprising:
   detecting whether a sensing capacitance value of a sensing signal is higher than a high threshold or lower than a low threshold,
   wherein when the sensing capacitance value of the sensing signal is higher than the high threshold, the method comprises:
      determining that a finger is placed on the fingerprint sensing device; and
      adjusting the high threshold and the low threshold according to the sensing capacitance value and a compensation value, and
   wherein when the sensing capacitance value of the sensing signal is lower than the low threshold, the method comprises:
      determining that the finger is removed from the fingerprint sensing device; and
      adjusting the high threshold and the low threshold according to the sensing capacitance value and the compensation value,
   wherein the high threshold is generated by adding the compensation value to the sensing capacitance value, and the low threshold is generated by subtracting the compensation value from the sensing capacitance value.

2. The method of claim 1, wherein the compensation value is a fixed value which is pre-set when the electronic device is shipped out, and its value is higher than a noise value.

3. The method of claim 1, further comprising:
   initializing the fingerprint sensing device;
   calibrating the fingerprint sensing device to obtain the sensing capacitance value;
   generating the high threshold and the low threshold; and
   setting a high flag value and a low flag value to be a first bit value, wherein when the high flag value is the first bit value, it means that it is not detected that the finger is placed on the fingerprint sensing device, and when the low flag value is the first bit value, it means that it is not detected that the finger is removed from the fingerprint sensing device.

4. The method of claim 1, further comprising:
   determining whether a high flag value is a first bit value when the sensing capacitance value of the sensing signal is higher than the high threshold;
   determining whether an object placed on the fingerprint sensing device is a real finger when the high flag value is the first bit value; and
   if the object is a real finger, generating a high threshold interrupt signal to indicate that it is detected that the finger is placed on the fingerprint sensing device, setting the high flag value to be a second bit value and setting a low flag value to be the first bit value.

5. The method of claim 1, further comprising:
   determining whether a high flag value is a first bit value when the sensing capacitance value of the sensing signal is lower than the low threshold; and
   when the high flag value is not the first bit value, generating a low threshold interrupt signal to indicate that it is detected that the finger is removed from the fingerprint sensing device, setting the high flag value to be the first bit value and setting a low flag value to be a second bit value.

6. The method of claim 1, wherein the step of adjusting the high threshold and the low threshold according to the sensing capacitance value and the compensation value comprises:
   generating the high threshold by adding the compensation value to the sensing capacitance value; and
   generating the low threshold by subtracting the compensation value from the sensing capacitance value.

7. The method of claim 1, wherein the step of adjusting the high threshold and the low threshold according to the sensing capacitance value and the compensation value comprises:
gradually adjusting the high threshold to be the value of the sensing capacitance value plus the compensation value; and
gradually adjusting the low threshold to be the value of the sensing capacitance value minus the compensation value.

8. An electronic device, comprising:
a fingerprint sensing device; and
a processor, coupled to the fingerprint sensing device, detecting whether a sensing capacitance value of a sensing signal is higher than a high threshold or lower than a low threshold,
wherein when the sensing capacitance value of the sensing signal is higher than the high threshold, the processor determines that a finger is placed on the fingerprint sensing device and adjusts the high threshold and the low threshold according to the sensing capacitance value and a compensation value, and
wherein when the sensing capacitance value of the sensing signal is lower than the low threshold, the processor determines that the finger is removed from the fingerprint sensing device and adjusts the high threshold and the low threshold according to the sensing capacitance value and the compensation value,
wherein the high threshold is generated by adding the compensation value to the sensing capacitance value, and the low threshold is generated by subtracting the compensation value from the sensing capacitance value.

9. The electronic device of claim 8, wherein the compensation value is a fixed value which is pre-set when the electronic device is shipped out, and its value is higher than a noise value.

10. The electronic device of claim 8, wherein when the fingerprint sensing device is initialized, the processor calibrates the fingerprint sensing device to obtain the sensing capacitance value, generates the high threshold and the low threshold and sets a high flag value and a low flag value to be a first bit value,
wherein when the high flag value is the first bit value, it means that it is not detected that the finger is placed on the fingerprint sensing device, and when the low flag value is the first bit value, it means that it is not detected that the finger is removed from the fingerprint sensing device.

11. The electronic device of claim 8, wherein when the sensing capacitance value of the sensing signal is higher than the high threshold, the processor determines whether a high flag value is a first bit value, wherein when the high flag value is the first bit value, the processor determines whether an object placed on the fingerprint sensing device is a real finger, and wherein if the object is a real finger, the processor generates a high threshold interrupt signal to indicate that it is detected that the finger is placed on the fingerprint sensing device, sets the high flag value to be a second bit value and sets a low flag value to be the first bit value.

12. The electronic device of claim 8, wherein when the sensing capacitance value of the sensing signal is lower than the low threshold, the processor determines whether a high flag value is a first bit value, and wherein when the high flag value is not the first bit value, the processor generates a low threshold interrupt signal to indicate that it is detected that the finger is removed from the fingerprint sensing device, sets the high flag value to be the first bit value and sets a low flag value to be a second bit value.

13. The electronic device of claim 8, wherein the processor generates the high threshold by adding the compensation value to the sensing capacitance value, and generates the low threshold by subtracting the compensation value from the sensing capacitance value.

14. The electronic device of claim 8, wherein the processor gradually adjusts the high threshold to be the value of the sensing capacitance value plus the compensation value, and gradually adjusts the low threshold to be the value of the sensing capacitance value minus the compensation value.

* * * * *